(12) United States Patent
Matsuo et al.

(10) Patent No.: US 10,527,839 B2
(45) Date of Patent: *Jan. 7, 2020

(54) EYEPIECE OPTICAL SYSTEM, OPTICAL APPARATUS AND METHOD FOR MANUFACTURING EYEPIECE OPTICAL SYSTEM

(71) Applicant: NIKON CORPORATION, Minato-ku, Tokyo (JP)

(72) Inventors: Taku Matsuo, Kawasaki (JP); Motohisa Mouri, Kawasaki (JP); Yukio Kubota, Tsurugashima (JP); Takuya Sato, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,492

(22) Filed: Jul. 6, 2018

(65) Prior Publication Data

US 2018/0329200 A1 Nov. 15, 2018

Related U.S. Application Data

(60) Division of application No. 14/676,688, filed on Apr. 1, 2015, now Pat. No. 10,042,157, which is a (Continued)

(30) Foreign Application Priority Data

Oct. 4, 2012 (JP) ................................ 2012-222537

(51) Int. Cl.
*G02B 25/00* (2006.01)
*G02B 15/14* (2006.01)
(Continued)

(52) U.S. Cl.
CPC ............ *G02B 25/001* (2013.01); *G02B 13/18* (2013.01)

(58) Field of Classification Search
CPC .. G02B 25/001; G02B 15/177; G02B 15/173; G02B 7/10; G02B 13/18; G02B 23/243;
(Continued)

(56) References Cited

U.S. PATENT DOCUMENTS 4,593,984 A 6/1986 Kimura et al.
5,708,531 A 1/1998 Yamada
(Continued)

FOREIGN PATENT DOCUMENTS

CN 102654640 A 9/2012
JP 60-227215 A 11/1965
(Continued)

OTHER PUBLICATIONS

Notice of Allowance dated Apr. 6, 2018 in U.S. Appl. No. 14/676,688.
(Continued)

*Primary Examiner* — Dawayne Pinkney
(74) *Attorney, Agent, or Firm* — Shapiro, Gabor and Rosenberger, PLLC

(57) ABSTRACT

Provided is an eyepiece optical system including at least three lenses disposed in order from an observation object (Ob) along an optical axis. A final lens disposed closest to an eye point (EP) (corresponds to the third lens (L3) in FIG. 1) is fixed when adjusting the diopter, and the following conditional expressions (1) and (2) are satisfied:

$2.2 < |fe/fa| < 6.0$ (1)

$0.5 < |Re2/fa| < 5.0$ (2)

where fe denotes a focal length of the final lens, fa denotes a focal length of the total eyepiece optical system (EL), and Re2 denotes a radius of curvature of the eye point
(Continued)

(EP) side lens surface of the final lens. When an optical surface is aspherical, a paraxial radius of curvature is used for calculation.

20 Claims, 8 Drawing Sheets

Related U.S. Application Data continuation of application No. PCT/JP2013/005931, filed on Oct. 4, 2013.

(51) Int. Cl.
  *G02B 9/12* (2006.01)
  *G02B 9/00* (2006.01)
  G02B 13/18 (2006.01)

(58) Field of Classification Search
  CPC ........ G02B 13/005; G02B 9/12; G02B 13/00; G02B 9/02
  USPC .............. 359/645, 689, 690, 695, 716, 735, 359/784–790, 797
  See application file for complete search history.

(56) References Cited

U.S. PATENT DOCUMENTS

| | | |
|---|---|---|
| 5,926,321 A | 7/1999 | Shikama |
| 5,986,816 A | 11/1999 | Shikama |
| 2012/0127595 A1 | 5/2012 | Matsuo |
| 2012/0224271 A1 | 9/2012 | Matsuo |
| 2013/0266302 A1 | 10/2013 | Miyano |

FOREIGN PATENT DOCUMENTS

| | | |
|---|---|---|
| JP | 60-191221 A | 9/1985 |
| JP | 02-110421 A | 4/1990 |
| JP | 10-253899 A | 9/1998 |
| JP | 2003-161915 A | 6/2003 |
| JP | 2005-010317 A | 1/2005 |
| JP | 2011-197492 A | 10/2011 |
| JP | 2012-181322 A | 9/2012 |
| WO | WO 2012/086160 A1 | 6/2012 |

OTHER PUBLICATIONS

Final Office Action dated Jul. 12, 2017 in U.S. Appl. No. 14/676,688.
Non-Final Office Action dated Oct. 27, 2016 in U.S. Appl. No. 14/676,688.
Office Action dated Apr. 25, 2017, in Chinese Patent Application No. 201380052003.3.
Office Action dated Jun. 27, 2016, in Chinese Patent Application No. 201380052003.3.
International Search Report from International Patent Application No. PCT/JP2013/005931, dated Jan. 7, 2014.
English translation of International Preliminary Report on Patentability from International Patent Application No. PCT/JP2013/005931, dated Apr. 16, 2015.

EYEPIECE OPTICAL SYSTEM, OPTICAL APPARATUS AND METHOD FOR MANUFACTURING EYEPIECE OPTICAL SYSTEM

TECHNICAL FIELD

The present invention relates to an eyepiece optical system for observing an image displayed on an image display element, that is suitable for an electronic view finder (EVF).

TECHNICAL BACKGROUND

An eyepiece optical system, which allows to observe an image displayed on a small image display element with high magnification, has been proposed (e.g. see Patent Document 1).

PRIOR ART LIST

Patent Document

Patent Document 1: Japanese Laid-Open Patent Publication No. 2003-161915 (A)

SUMMARY OF THE INVENTION

Problems to be Solved by the Invention

In a conventional eyepiece optical system, a plate type protective optical element is fixed on the side closest to the eye point in order to protect the optical system and enhance the dust proof performance. However, when an object with high brightness is observed using a liquid crystal display element for the image display element, ghosts and stray lights are generated by the reflection on the display element and surface of the optical element closest to the eye point.

With the foregoing in view, it is an object of the present invention to provide an eyepiece optical system having good optical performance with minimum generation of ghosts and stray lights, an optical apparatus including this eyepiece optical system, and a method for manufacturing the eyepiece optical system.

Means to Solve the Problems

To achieve this object, an eyepiece optical system according to the present invention includes at least three lenses disposed in order from an observation object along an optical axis, a final lens disposed closest to an eye point is fixed when adjusting a diopter, and the following conditional expressions are satisfied:

$$2.2 < |fe/fa| < 6.0$$

$$0.5 < |Re2/fa| < 5.0$$

where fe denotes a focal length of the final lens, fa denotes a focal length of the total eyepiece optical system, and Re2 denotes a radius of curvature of an eye point side lens surface of the final lens. When an optical surface is aspherical, a paraxial radius of curvature is used for calculation.

In the eyepiece optical system according to the present invention, it is preferable that the observation object is an image display element.

In the eyepiece optical system according to the present invention, it is preferable that the image display element is a liquid crystal display element.

In the eyepiece optical system according to the present invention, it is preferable that the following conditional expression is satisfied.

$$0.60 < \Sigma d/fa < 1.60$$

where $\Sigma d$ denotes a distance on the optical axis, from an observation object side lens surface of a first lens disposed closest to the observation object to the eye point side lens surface of the final lens.

In the eyepiece optical system according to the present invention, it is preferable that the following conditional expression is satisfied.

$$0.60 < \Sigma d0/fa < 1.20$$

where $\Sigma d0$ denotes a distance on the optical axis, from an observation object side lens surface of a first lens disposed closest to the observation object to the eye point side lens surface of the final lens. An air conversion length is used for an optical element that has no refractive power.

In the eyepiece optical system according to the present invention, it is preferable that the following conditional expression is satisfied.

$$5.00 < fa < 35.00 \text{ (unit:mm)}$$

In the eyepiece optical system according to the present invention, it is preferable that all the lenses are made of plastic.

It is preferable that the eyepiece optical system according to the present invention includes, in order from the observation object along an optical axis, a first lens and a second lens, wherein the diopter is adjusted by moving the first lens and the second lens, or only the second lens, along the optical axis.

An optical apparatus according to the present invention includes: an objective lens; a picture element that captures an image formed by the objective lens; an image display element that displays the image captured by the picture element; and an eyepiece optical system for observing the image displayed on the image display element, and the eyepiece optical system is any of the eyepiece optical systems described above.

A method for manufacturing an eyepiece optical system according to the present invention is a method for manufacturing an eyepiece optical system including at least three lenses disposed in order from an observation object along an optical axis, the method including: fixing a final lens disposed closest to an eye point side, when adjusting a diopter; and disposing each lens in a lens barrel so as to satisfy the following conditional expressions.

$$2.2 < |fe/fa| < 6.0$$

$$0.5 < |Re2/fa| < 5.0$$

where fe denotes a focal length of the final lens, fa denotes a focal length of the total eyepiece optical system, and Re2 denotes a radius of curvature of an eye point side lens surface of the final lens. When an optical surface is aspherical, a paraxial radius of curvature is used for calculation.

Advantageous Effects of the Invention

According to the present invention, an eyepiece optical system having good optical performance with minimum generation of ghosts and stray lights, an optical apparatus including this eyepiece optical system, and a method for manufacturing the eyepiece optical system can be provided.

DESCRIPTION OF THE EMBODIMENTS

An embodiment of the present invention will be described with reference to the drawings.

To protect an eyepiece optical system and enhance dust proof performance, a fixed optical element has conventionally been disposed on the side closest to the eye point, but if a plastic lens is used for the optical element, a sufficient effect cannot be demonstrated even if treated with anti-reflection coating, and reflection on the surface of this optical element stands out.

Therefore in the eyepiece optical system according to this embodiment, the final lens disposed closest to the eye point has a shape that satisfies the claims, whereby reflection on this lens surface is suppressed, and even if reflection is generated, an image of a glare due to ghosts is formed outside the diopter that corresponds to the eye, so that the reflection does not stand out, whereby the above problem is solved.

Figure 7:
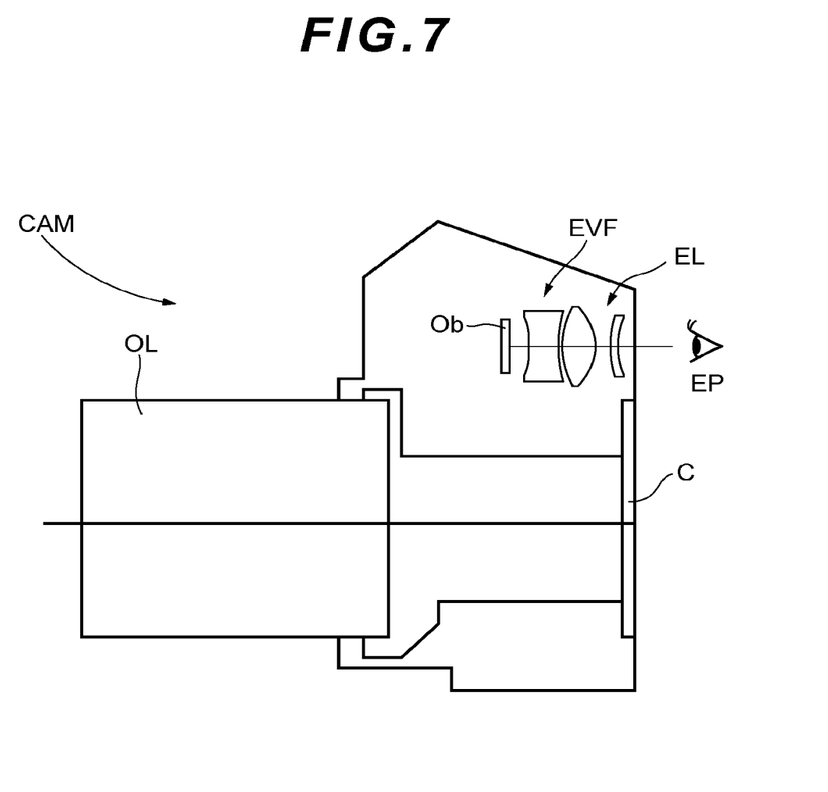
FIG. 7 is a cross-sectional view of a digital camera.

The eyepiece optical system according to this embodiment is suitable for an electronic view finder EVF (see FIG. 7). Therefore the observation object is preferably an image display element. Here it is preferable that the image display element is a liquid crystal display element. A liquid crystal display element displays an image using the polarizing characteristic of liquid crystal, hence the range in which good display luminous flux can be acquired is narrow. Generally this range is regarded to be ±10° from the direction perpendicular to the display surface, and light attenuation and change of tone are generated outside this range. This means that an eyepiece optical system, to observe a liquid crystal display element, requires some telecentricity. This Characteristic is considered in the eyepiece optical system according to this embodiment.

Figure 1:
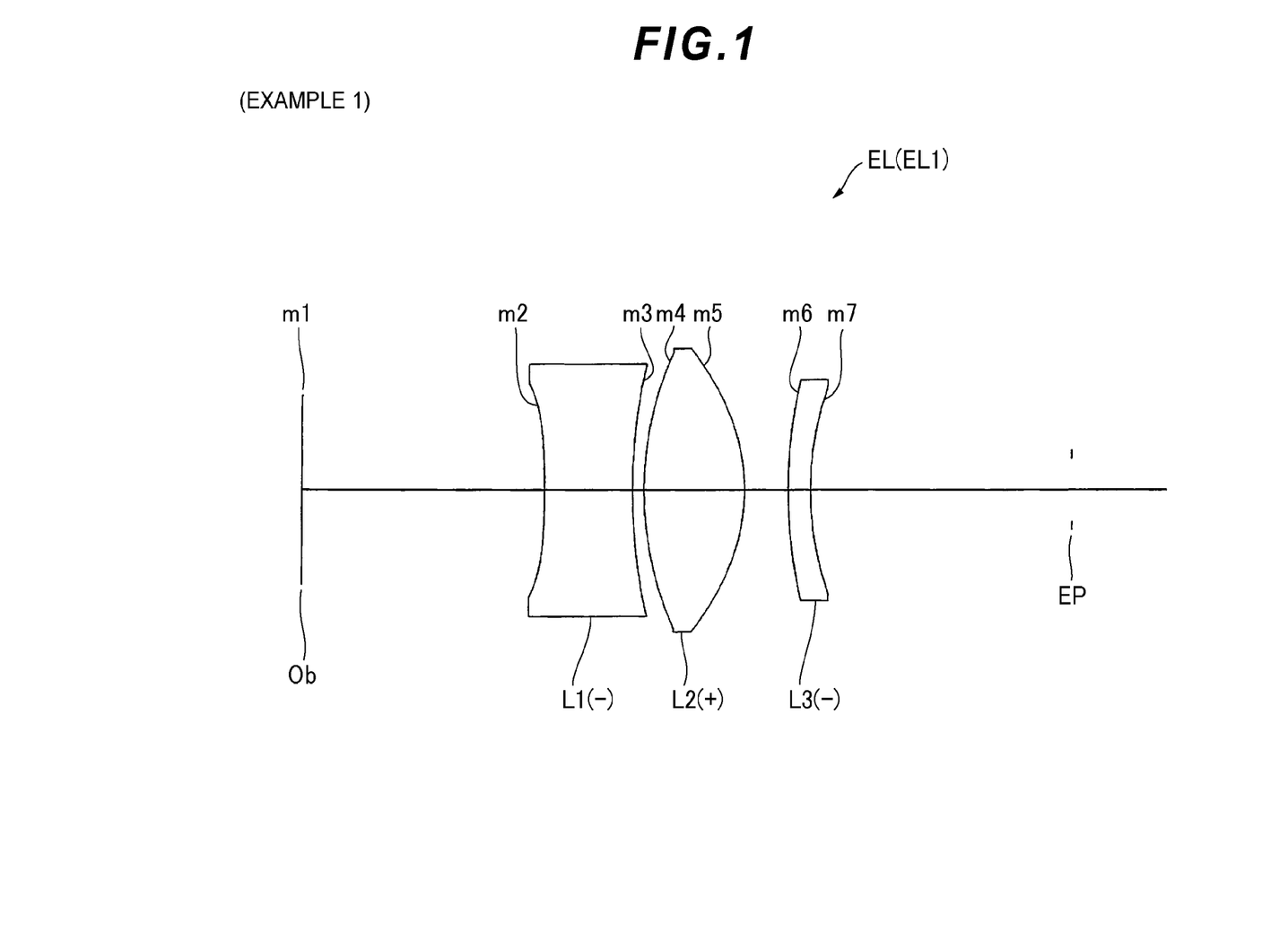
FIG. 1 is a diagram depicting a configuration of an eyepiece optical system according to Example 1.

As shown in FIG. 1, the eyepiece optical system EL according to this embodiment includes at least three lenses disposed in order from an observation object Ob side, and the final lens disposed closest to the eye point EP is fixed when adjusting the diopter, and the following conditional expressions (1) and (2) are satisfied.

In FIG. 1, the eyepiece optical system EL is constituted by three lenses: a first lens L1, a second lens L2 and a third lens L3 in order from the observation object Ob. In this case, the final lens is the third lens L3.

$$2.2 < |fe/fa| < 6.0 \quad (1)$$

$$0.5 < |Re2/fa| < 5.0 \quad (2)$$

where fe denotes a focal length of the final lens, fa denotes a focal length of the total eyepiece optical system EL, and Re2 denotes a radius of curvature of the eye point EP side lens surface of the final lens. When an optical surface is aspherical, a paraxial radius of curvature is used for calculation.

The conditional expression (1) specifies a ratio of the focal length of the final lens with respect to the focal length of the total eyepiece optical system EL.

If the lower limit value of the conditional expression (1) is not reached, power of the final lens becomes strong and appearance drops due to assembly errors. The curvature of field also worsens.

If the upper limit value of the conditional expression (1) is exceeded, ghosts and stray lights stand out when reflection is generated on the lens surface.

To demonstrate the effect of the above mentioned result with a certainty, it is preferable that the lower limit value of the conditional expression (1) is 3.0. To demonstrate the effect of the above mentioned result with certainty, it is preferable that the upper limit of the conditional expression (1) is 5.0.

The conditional expression (2) specifies the ratio of the radius of curvature of the eye point EP side lens surface of the final lens, with respect to the focal length of the total eye piece optical system EL.

If the lower limit value of the conditional expression (2) is not reached, strong external light from the outside is reflected on the lens surface and ghosts and stray lights are generated, which may cause discomfort to the user. The curvature of field also worsens.

If the upper limit value of the conditional expression (2) is exceeded, ghosts and stray lights reflected on the image display element (observation element) Ob and the eye point EP side lens surface of the final lens stand out. In particular, if the eye point EP side lens surface of the final lens has a positive radius of curvature, reflection of the eye of the user stands out, which may cause discomfort. The curvature of field also worsens.

To demonstrate the above mentioned effect with certainty, it is preferable that the lower limit value of the conditional expression (2) is 0.6. To demonstrate the above mentioned effect with certainty, it is preferable that the upper limit value of the conditional expression (2) is 3.5.

In the eyepiece optical system EL according to this embodiment, it is preferable that the following conditional expression (3A) is satisfied.

$$0.60 < \Sigma d/fa < 1.60 \quad (3A)$$

where $\Sigma d$ denotes a distance on the optical axis, from an observation object Ob side lens surface of the first lens L1 disposed closest to the observation object to the eye point EP side lens surface of the final lens.

The conditional expression (3A) specifies the ratio of the total length of the lens portion with respect to the focal length of the total eyepiece optical system EL.

If the lower limit value of the conditional expression (3A) is not reached, a sufficient lens thickness cannot be secured, and satisfactory coma aberration correction becomes difficult.

If the upper limit value of the conditional expression (3A) is exceeded, the total length of the optical system becomes long, and correction of distortion and curvature of field becomes difficult if miniaturization is attempted.

To demonstrate the above mentioned effect with certainty, it is preferable that the lower limit value of the conditional expression (3A) is 0.62. To demonstrate the above mentioned effect with further certainty, it is preferable that the lower limit value of the conditional expression (3A) is 0.63.

To demonstrate the above mentioned effect with certainty, it is preferable that the upper limit value of the conditional expression (3A) is 1.40. To demonstrate the above mentioned effect with further certainty, it is preferable that the upper limit value of the conditional expression (3A) is 1.20. To demonstrate the above mentioned effect to the maximum, it is preferable that the upper limit value of the conditional expression (3A) is 1.00.

In the eyepiece optical system according to this embodiment, it is preferable that the following conditional expression (3B) is satisfied.

$$0.60 < \Sigma d0/fa < 1.20 \qquad (3B)$$

where $\Sigma d0$ denotes a distance on the optical axis, from the observation object side lens surface of the first lens disposed closest to the observation object to the eye point side lens surface of the final lens. Air conversion length is used for an optical element that has no refractive power.

The conditional expression (3B) specifies the ratio of the total air conversion length of the lens portion with respect to the focal length of the total eyepiece optical system EL.

If the lower limit value of the conditional expression (3B) is not reached, sufficient lens thickness cannot be secured, and satisfactory coma aberration correction becomes difficult.

If the upper limit value of the conditional expression (3B) is exceeded, the total length of the optical system becomes long, and the correction of distortion and curvature of field becomes difficult if miniaturization is attempted.

To demonstrate the above mentioned effect with certainty, it is preferable that the lower limit value of the conditional expression (3B) is 0.62. To demonstrate the above mentioned effect with further certainty, it is preferable that the lower limit value of the conditional expression (3B) is 0.63.

To demonstrate the above mentioned effect with certainty, it is preferable that the upper limit value of the conditional expression (3B) is 1.10. To demonstrate the above mentioned effect with further certainty, it is preferable that the upper limit value of the conditional expression (3B) is 1.00. To demonstrate the above mentioned effect to the maximum, it is preferable that the upper limit value of the conditional expression (3B) is 0.90.

In the eyepiece optical system EL according to this embodiment, it is preferable that the following conditional expression (4) is satisfied.

$$5.00 < fa < 35.00 \text{ (unit:mm)} \qquad (4)$$

The conditional expression (4) specifies the focal length of the total eyepiece optical system EL.

If the lower limit value of the conditional expression (4) is not reached, the lens diameter becomes large, and the correction of distortion and coma aberration becomes difficult accordingly.

If the upper limit value of the conditional expression (4) is exceeded, the total length of the optical system becomes long, and the worsening of distortion and curvature of field is inevitable if miniaturization is attempted.

To demonstrate the above mentioned effect with certainty, it is preferable that the lower limit value of the conditional expression (4) is 10.00. To demonstrate the above mentioned effect with certainty, it is preferable that the lower limit value of the conditional expression (4) is 15.00. To demonstrate the above mentioned effect to the maximum, it is preferable that the lower limit value of the conditional expression (4) is 20.00.

To make the above mentioned effect with certainty, it is preferable that the upper limit value of the conditional expression (4) is 32.00. To make the above mentioned effect with further certainty, it is preferable that the upper limit value of the conditional expression (4) is 29.00. To make the above mentioned effect to the maximum, it is preferable that the upper limit value of the conditional expression (4) is 27.00.

In the eyepiece optical system EL according to this embodiment, it is preferable that at least one lens surface, out of the lens surfaces constituting the first lens L1 to the final lens, is aspherical. In particular, if the observation object Ob side lens surface of the first lens L1 is aspherical, the correction of coma aberration, astigmatism and distortion can be improved. If the eye point EP side lens surface of the second lens L2 is aspherical, the correction of distortion, coma aberration and spherical aberration can be improved.

In the eyepiece optical system EL according to this embodiment, it is preferable that all the lenses are made of plastic. Because of this configuration, an aspherical surface can easily be formed, and a sufficient aberration correction capability can be demonstrated for various aberrations, including coma aberration and distortion.

Since the eyepiece optical system EL includes, in order from the observation object Ob, the first lens L1 and the second lens L2, and the first lens L1 and the second lens L2 are simultaneously moved or only the second lens L2 is moved along the optical system, the diopter can be adjusted without dropping the optical performance. If the final lens is fixed on the optical axis with respect to the observation object Ob when adjusting the diopter, an optical element to protect the lens becomes unnecessary, ghosts and stray lights are prevented, and dust proof performance can be enhanced.

FIG. 7 shows a digital camera CAM as an optical apparatus including the above mentioned eyepiece optical system EL. The digital camera CAM is constituted by an objective lens OL, a picture element C, such as CCD and CMOS, and an electronic view finder EVF. The electronic view finder EVF includes an image display element (observation object) Ob such as a liquid crystal display element, and the eyepiece optical system EL for magnifying and observing an image displayed on the image display element Ob.

In the digital camera CAM having the above configuration, light from an object (not illustrated) is collected by the objective lens OL and forms an image of the object on the picture element C. The image of the object formed on the picture element C is captured by the picture element C, and the image of the object captured by the picture element C is displayed on the image display element Ob. The user positions an eye on the eye point EP, whereby the image of the object formed by the objective lens OL can be observed in a magnified state via the eyepiece optical system EL.

If the user presses a release button (not illustrated), the image captured by the picture element C (that is, an image corresponding to the image which is displayed on the image display element Ob and is observed via the eyepiece optical system EL) is recorded in a memory (not illustrated) as an image of the object. In this way, the user can photograph an object using the digital camera CAM.

According to the above mentioned digital camera CAM including the eyepiece optical system EL of this invention, a camera in which various aberrations, particularly coma aberration and distortion, are satisfactorily corrected, can be implemented.

Figure 8:
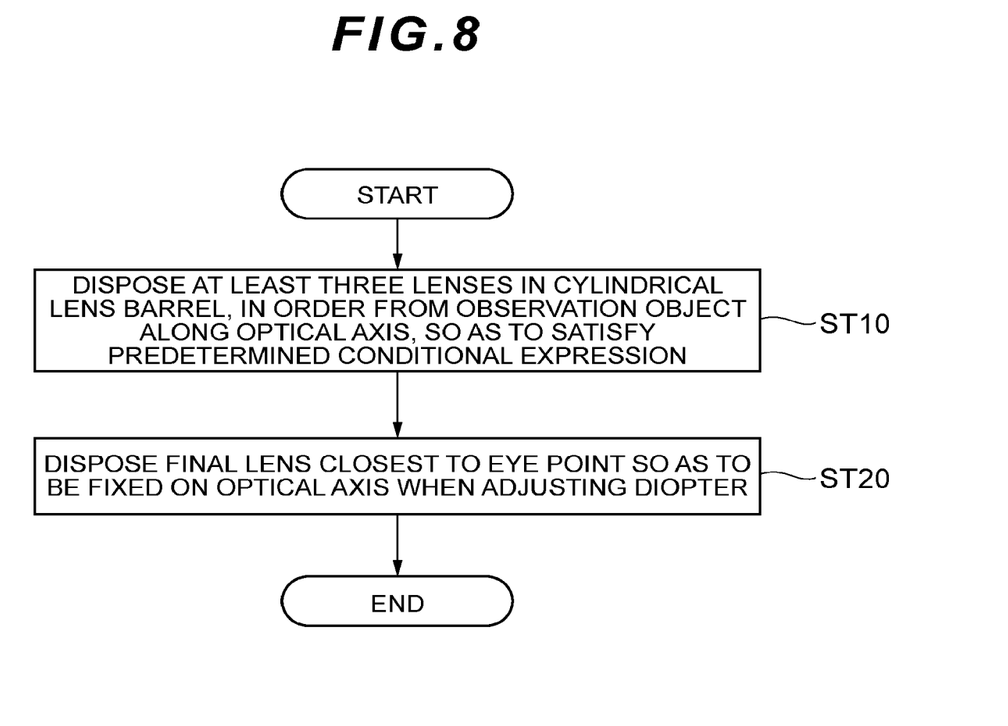
FIG. 8 is a flow chart depicting a method for manufacturing the eyepiece optical system according to the present embodiment.

Now an outline of a method for manufacturing the above mentioned eyepiece optical system will be described with reference to FIG. 8. First at least three lenses are disposed, in order from the observation object along the optical axis, in a cylindrical lens barrel, so as to satisfy the following conditional expressions (1) and (2) (step ST10). Then the final lens located closest to the eye point is disposed, so as to be fixed on the optical axis when adjusting the diopter (step ST20).

$$2.2 < |fe/fa| < 6.0$$

$$0.5 < |Re2/fa| < 5.0$$

where fe denotes a focal length of the final lens, fa denotes a focal length of the total eyepiece optical system, and Re2 denotes a radius of curvature of an eye point side lens surface of the final lens. When an optical surface is aspherical, a paraxial radius of curvature is used for calculation.

As shown in FIG. 1, according to an example of the lens arrangement of the eyepiece optical system of this embodiment, a negative biconcave lens is disposed as the first lens L1. A positive biconvex lens is disposed as the second lens L2. A negative meniscus lens having a concave surface facing the eye point is disposed as the third lens L3. When adjusting the diopter, the first lens L1 and the second lens L2 are simultaneously moved along the optical axis, while the third lens L3, which is the final lens located closest to the eye point, is fixed on the optical axis with respect to the observation object Ob. Each lens is assembled in the lens barrel so as to satisfy the conditional expressions (1) and (2) (correspondence value of the conditional expression (1) is 4.02, and correspondence value of the conditional expression (2) is 0.70).

According to the method for manufacturing the eyepiece optical system of this embodiment, an eyepiece optical system having good optical performance with a minimum generation of ghosts and stray lights can be implemented.

EXAMPLES

Each example according to this embodiment will now be described with reference to the drawings. Table 1 to Table 3 shown below are tables of each data of Example 1 to Example 3.

In each example, the d-line (wavelength: 587.5620 nm) and the g-line (wavelength: 435.8350 nm) are selected to calculate aberration characteristics.

In [General Data] in each table, fe denotes the focal length of the final lens disposed closest to the eye point EP, fa is the focal length of the total eyepiece optical system, ω denotes an apparent angle of field (half angle of view) at $-1 \text{ m}^{-1}$, and TL denotes a total length of the eyepiece optical system EL (distance on the optical axis from the observation object Ob surface at $-1 \text{ m}^{-1}$ to the lens surface closest to the eye point EP in the eyepiece optical system).

In [Lens Data] in each table, the surface number is the sequential number of the optical surface counted from the observation object Ob side in the light traveling direction, r denotes the radius of curvature of each optical surface, D denotes a distance on the optical axis from each optical surface to the next optical surface (or the eye point EP), vd denotes the Abbe number of the lens material at the d-line, nd denotes the refractive index of the lens material at the d-line, (variable) indicates the variable surface distance, "∞" in the radius of curvature r indicates a plane, and EP denotes the eye point respectively. The refractive index of air "1.0000" is omitted. When an optical surface is aspherical, "*" is attached to the surface number, and the paraxial radius of curvature is shown in the column of the radius of curvature r.

In [Aspherical Data] in each table, the form of the aspherical surface shown in [Lens Data] is indicated by the following expression (a). Here X(y) denotes a distance along the optical axis direction from a tangential plane at the vertex of the aspherical surface to each position on the aspherical surface at height y, r denotes a radius of curvature (paraxial radius of curvature) of the reference spherical surface, κ denotes a conical coefficient, and Ai denotes an aspherical coefficient in the i-th order. "E-n" indicates "× $10^{-n}$". For example, $1.234\text{E}-05 = 1.234 \times 10^{-5}$.

$$X(y) = (y^2/r)/\{1 + (1 - \kappa \cdot y^2/r^2)^{1/2}\} + A4 \times y^4 + A6 \times y^6 + A8 \times y^8 \quad (a)$$

In [Conditional Expression] in each table, a value corresponding to each conditional expression (1) to (4) is shown.

For the unit of the diopter, "$m^{-1}$" is used. Diopter X $[m^{-1}]$ refers to an image formed by the eyepiece optical system EL located at a position 1/X [m (meter)] on the optical axis from the eye point EP. (The sign is positive when the image is formed on the observer side from the eyepiece optical system EL.)

In all the data values herein below, "mm" is normally used as the unit of the focal length f, radius of curvature r, surface distance D and other lengths, unless otherwise specified, but the unit is not limited to "mm", and another appropriate unit may be used since an equivalent optical performance is obtained even if the optical system is proportionally expanded or proportionally reduced.

This description on a table is the same for all the examples, and is therefore omitted herein below.

Example 1

Example 1 will be described with reference to FIG. 1, FIG. 2 and Table 1. As shown in FIG. 1, an eyepiece optical system EL (EL1) according to Example 1 includes, in order from an observation object (image display element) Ob, a first lens L1 having negative refractive power, a second lens L2 having positive refractive power, and a third lens L3 (final lens) having negative refractive power.

The first lens L1 is a negative biconcave lens. The observation object Ob side lens surface of the first lens L1 is aspherical.

The second lens L2 is a positive biconvex lens. The eye point EP side lens surface of the second lens L2 is aspherical.

The third lens L3 is a negative meniscus lens having a concave surface facing the eye point EP.

The diopter is adjusted by simultaneously moving the first lens L1 and the second lens L2 along the optical axis. At this time, the third lens L3 is fixed on the optical axis with respect to the observation object Ob.

Table 1 shows each data value of Example 1. The surface numbers 1 to 7 in Table 1 correspond to optical surfaces m1 to m7 in FIG. 1 respectively. In Example 1, the surfaces 2 and 5 are aspherical.

Each reference numeral and character in FIG. 1 is independent from other examples in order to simplify description. Therefore even if the reference numeral and character are the same as those in the drawing of another example, this does not mean that the configuration is necessarily the same as the other example.

TABLE 1

[General Data]

fe = −103.68 (mm)
fa = 25.79 (mm)
ω = 26.22°
TL = 34.5 (mm)

[Lens Data]

| Surface number | r | D | vd | nd |
|---|---|---|---|---|
| 1 | ∞ | 16.2 | | |
| *2 | −51.98159 | 6.0 | 23.89 | 1.63550 |
| 3 | 32.92255 | 0.8 | | |
| 4 | 19.68874 | 7.0 | 56.21 | 1.52444 |
| *5 | −11.30158 | 3.0 | | |
| 6 | 28.66506 | 1.5 | 57.08 | 1.49108 |
| 7 | 18.02378 | 18.0 | | |
| EP | | | | |

[Aspherical Data]

Surface 2   κ = 4.89886, A4 = −0.20046E−03, A6 = −0.19561E−05, A8 = −0.23308E−08
Surface 5   κ = −0.01352, A4 = −0.33928E−04, A6 = −0.14109E−06, A8 = 0.40422E−08

[Conditional Expression]

Conditional Expression (1) |fe/fa| = 4.02
Conditional Expression (2) |Re2/fa| = 0.70
Conditional Expression (3A) Σd/fa = 0.71
Conditional Expression (3B) Σd0/fa = 0.71
Conditional Expression (4) fa = 25.79 (mm)

As the data in Table 1 shows, the eyepiece optical system of Example 1 satisfies the conditional expressions (1) to (4).

Figure 2:
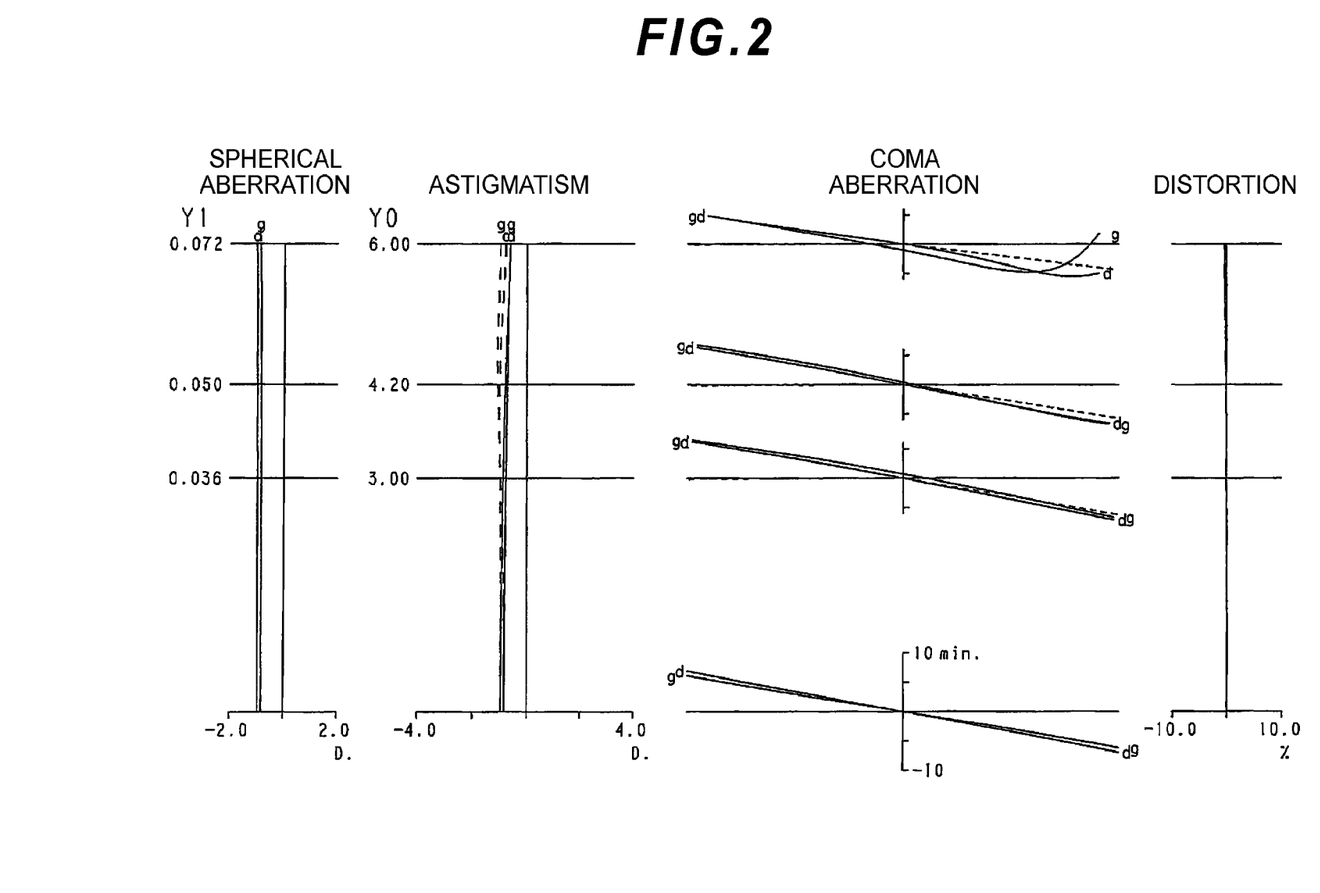
FIG. 2 shows graphs of various aberrations of the eyepiece optical system according to Example 1 when the diopter is $-1$ m$^{-1}$.

FIG. 2 shows graphs of various aberrations (spherical aberration, astigmatism, coma aberration and distortion) of the eyepiece optical system EL1 of Example 1 at diopter In each graph showing aberrations, Y1 indicates the height of the incident light when light emitted from the optical axis center of the observation object Ob enters the tangential plane of the observation object Ob side lens surface of the first lens L1 of the eyepiece optical system EL1. d indicates an aberration curve at the d-line, and g indicates an aberration curve at the g-line. When neither d nor g is indicated, this means that the aberration curve is at the d-line. In the graph showing astigmatism, the solid line indicates the sagittal image surface, and the broken line indicates the meridional image surface. In the graph showing coma aberration, "min" indicates "minute" of the angle unit. In the graph showing spherical aberration and the graph showing astigmatism, the unit of the abscissa is $[m^{-1}]$ respectively, which is indicated as "D." in the drawing.

The description on the graphs showing aberrations is the same for the other examples, where this description is omitted.

As each graph showing aberrations in FIG. 2 clarifies, in the eyepiece optical system EL1 of Example 1, various aberrations including coma aberration and distortion are satisfactorily corrected, and excellent optical performance is implemented.

Example 2

Figure 3:
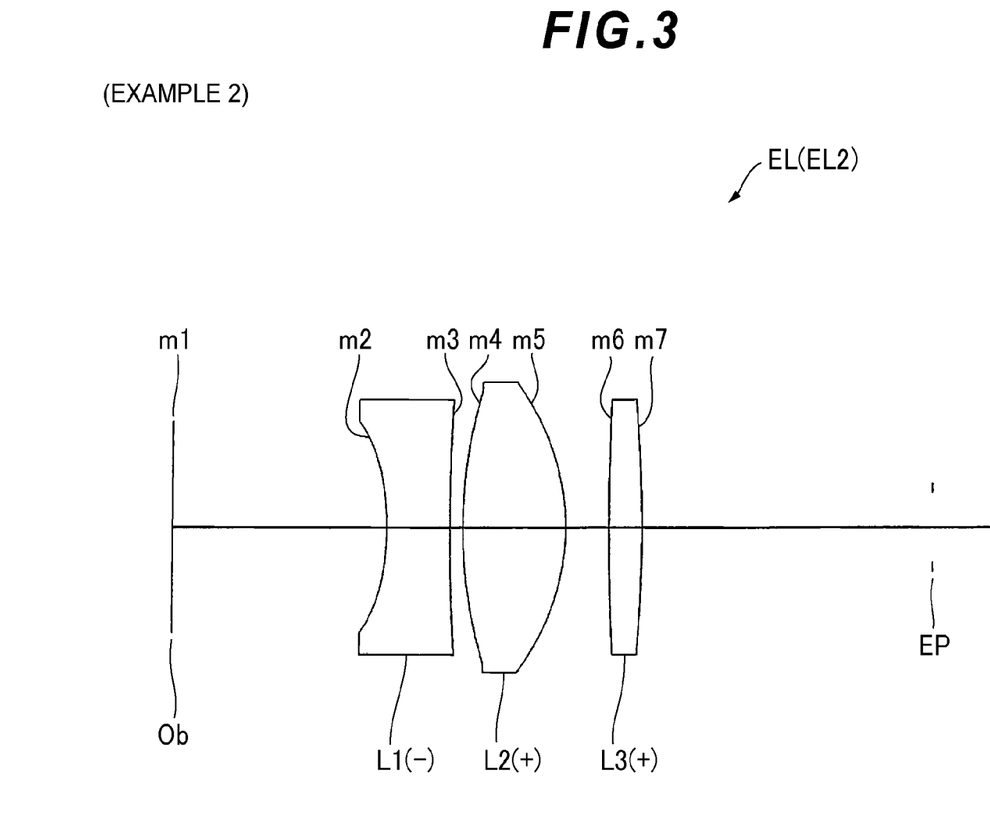
FIG. 3 is a diagram depicting a configuration of an eyepiece optical system according to Example 2.

Example 2 will be described with reference to FIG. 3, FIG. 4 and Table 2. As shown in FIG. 3, an eyepiece optical system EL (EL2) according to Example 2 includes, in order from an observation object (image display element) Ob, a first lens L1 having negative refractive power, a second lens L2 having positive refractive power, and a third lens L3 (final lens) having positive refractive power.

The first lens L1 is a negative biconcave lens. The observation object Ob side lens surface of the first lens L1 is aspherical.

The second lens L2 is a positive biconvex lens. The eye point EP side lens surface of the second lens L2 is aspherical.

The third lens L3 is a positive biconvex lens.

The diopter is adjusted by simultaneously moving the first lens L1 and the second lens L2 along the optical axis. At this time, the third lens L3 is fixed on the optical axis with respect to the observation object Ob.

Table 2 shows each data value of Example 2. The surface numbers 1 to 7 in Table 2 correspond to optical surfaces m1 to m7 in FIG. 3 respectively. In Example 2, the surfaces 2 and 5 are aspherical.

TABLE 2

[General Data]

fe = 103.82 (mm)
fa = 24.59 (mm)
ω = 27.30°
TL = 28.5 (mm)

[Lens Data]

| Surface number | r | D | vd | nd |
|---|---|---|---|---|
| 1 | ∞ | 12.8 | | |
| *2 | −15.28582 | 3.8 | 23.89 | 1.63550 |
| 3 | 111.39414 | 0.8 | | |
| 4 | 25.04543 | 6.4 | 56.21 | 1.52444 |
| *5 | −12.00675 | 2.7 | | |
| 6 | 145.24769 | 2.0 | 57.08 | 1.49108 |
| 7 | −78.20808 | 18.0 | | |
| EP | | | | |

[Aspherical Data]

Surface 2   κ = −1.60623, A4 = −0.38025E−03, A6 = −0.15854E−05, A8 = −0.95068E−08
Surface 5   κ = −0.13459, A4 = −0.70616E−04, A6 = 0.80397E−07, A8 = 0.26710E−08

[Conditional Expression]

Conditional Expression (1) |fe/fa| = 4.22
Conditional Expression (2) |Re2/fa| = 3.18
Conditional Expression (3A) Σd/fa = 0.64
Conditional Expression (3B) Σd0/fa = 0.64
Conditional Expression (4) fa = 24.59 (mm)

As the data in Table 2 shows, the eyepiece optical system EL2 of Example 2 satisfies all the conditional expressions (1) to (4).

Figure 4:
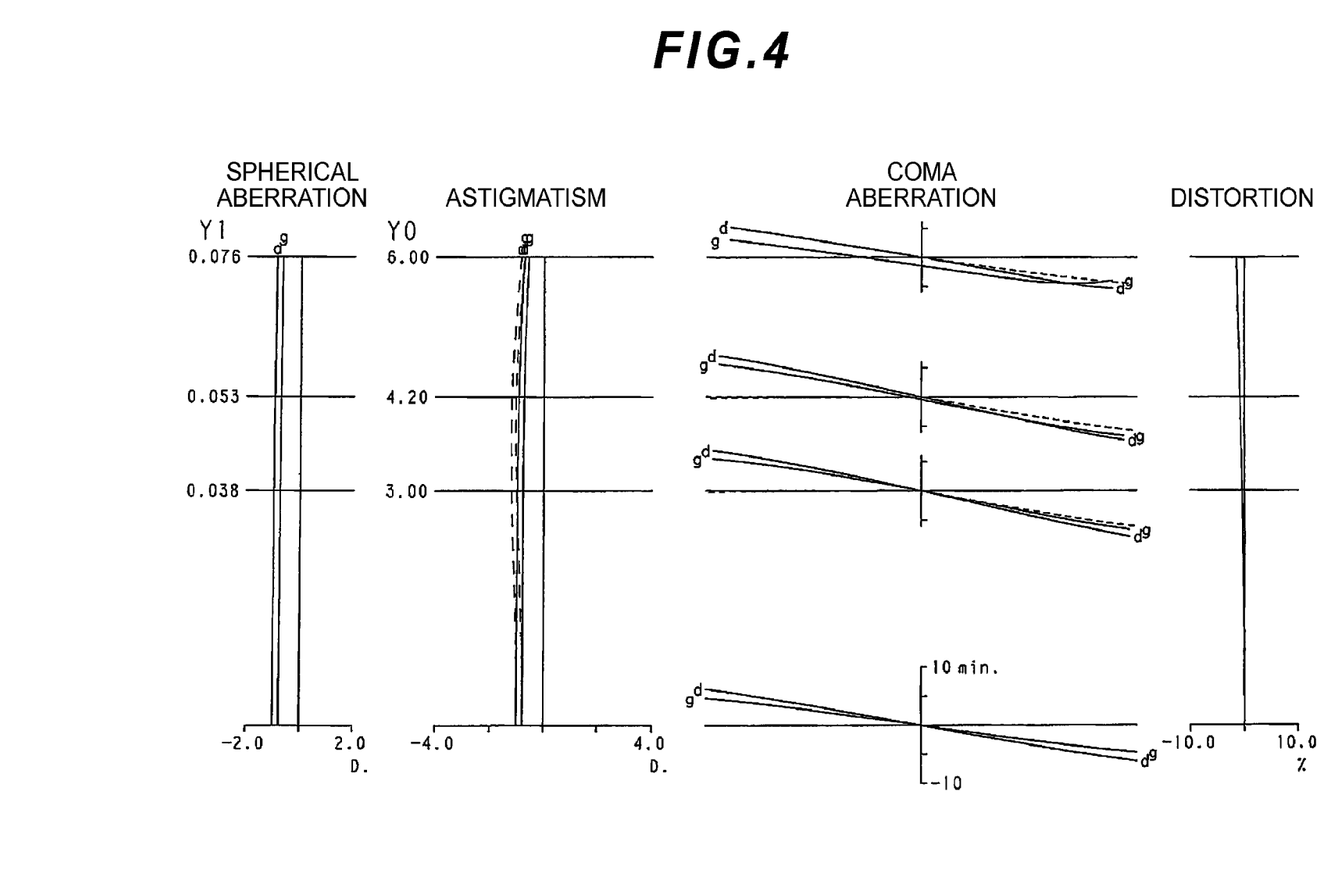
FIG. 4 shows graphs of various aberrations of the eyepiece optical system according to Example 2 when the diopter is $-1$ m$^{-1}$.

FIG. 4 are graphs showing various aberrations (spherical aberration, astigmatism, coma aberration and distortion) of the eyepiece optical system EL2 of Example 2 at diopter −1 $m^{-1}$. As each graph showing aberrations in FIG. 4 clarifies, in the eyepiece optical system EL2 of Example 2, various aberrations including coma aberration and distortion are satisfactorily corrected, and excellent optical performance is implemented.

Example 3

Figure 5:
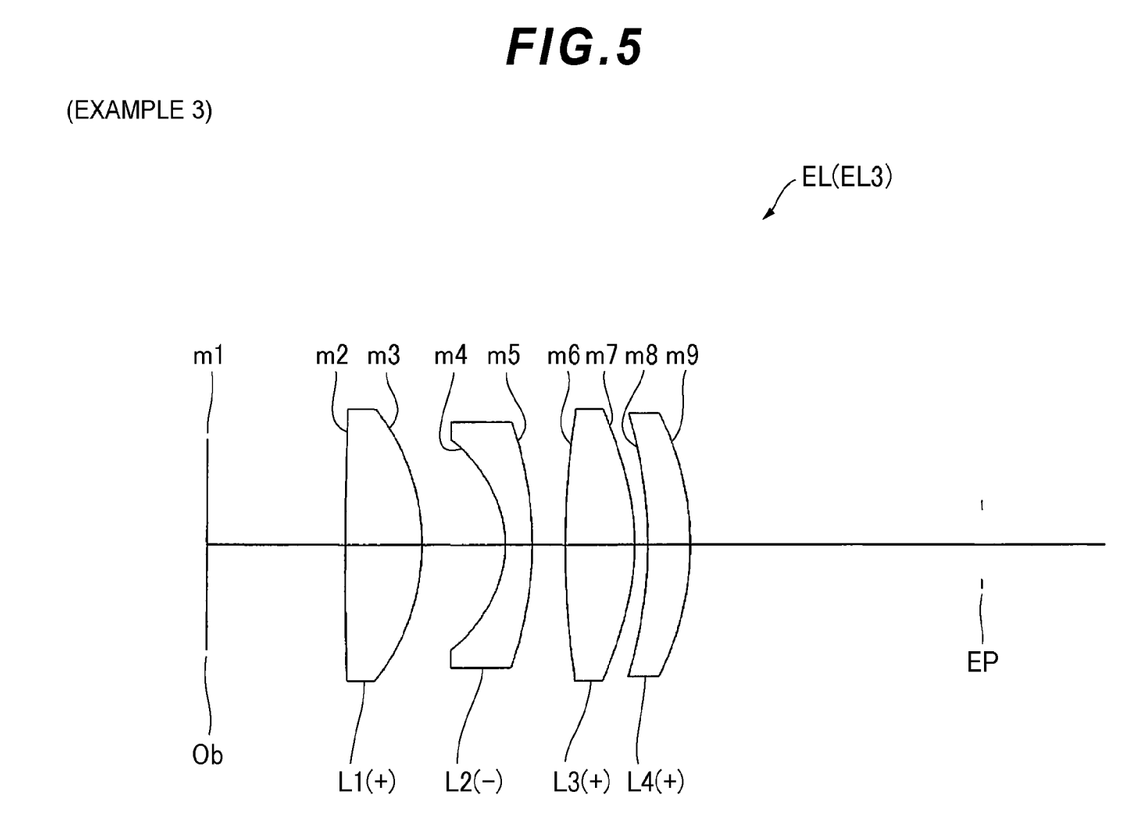
FIG. 5 is a diagram depicting a configuration of an eyepiece optical system according to Example 3.

Example 3 will be described with reference to FIG. 5, FIG. 6 and Table 3. As shown in FIG. 5, an eyepiece optical system EL (EL3) according to Example 3 includes, in order from an observation object (image display element) Ob, a first lens L1 having positive refractive power, a second lens L2 having negative refractive power, a third lens L3 having positive refractive power, and a fourth lens L4 (final lens) having positive refractive power.

The first lens L1 is a positive biconvex lens.

The second lens L2 is a negative meniscus lens having a concave surface facing the observation object Ob. The observation object Ob side lens surface of the second lens L2 is aspherical.

The third lens L3 is a positive biconvex lens. The eye point EP side lens surface of the third lens L3 is aspherical.

The fourth lens L4 is a negative meniscus lens having a concave surface facing the observation object Ob.

The diopter is adjusted by simultaneously moving the first lens L1 and the second lens L2 along the optical axis. At this time, the third lens L3 and the fourth lens L4 are fixed on the optical axis with respect to the observation object Ob.

Table 3 shows each data value of Example 3. The surface numbers 1 to 9 in Table 3 correspond to optical surfaces m1 to m9 in FIG. 5 respectively. In Example 3, the surfaces 4 and 7 are aspherical.

TABLE 3

[General Data]

$f_e$ = 81.49 (mm)
$f_a$ = 24.10 (mm)
$\omega$ = 28.12°
TL = 29.8 (mm)

[Lens Data]

| Surface number | r | D | vd | nd |
|---|---|---|---|---|
| 1 | ∞ | 8.6 | | |
| 2 | 229.82404 | 4.7 | 56.21 | 1.52444 |
| 3 | −11.86646 | 5.1 | | |
| *4 | −6.11377 | 1.7 | 23.89 | 1.63550 |
| 5 | −19.35843 | 2.0 | | |
| 6 | 46.64412 | 4.3 | 56.21 | 1.52444 |
| *7 | −13.42085 | 0.8 | | |
| 8 | −24.41258 | 2.6 | 57.08 | 1.49108 |
| 9 | −15.69482 | 18.0 | | |
| EP | | | | |

[Aspherical Data]

Surface 4  κ = 0.67273, A4 = 0.12437E−03, A6 = 0.20583E−05, A8 = 0.81215E−07
Surface 7  κ = 1.35050, A4 = 0.13938E−03, A6 = 0.59071E−06, A8 = −0.10212E−08

[Conditional Expression]

Conditional Expression (1) |fe/fa| = 3.38
Conditional Expression (2) |Re2/fa| = 0.65
Conditional Expression (3A) Σd/fa = 0.88
Conditional Expression (3B) Σd0/fa = 0.88
Conditional Expression (4) fa = 24.10 (mm)

As the data in Table 3 shows, the eyepiece optical system EL3 of Example 3 satisfies all the conditional expressions (1) to (4).

Figure 6:
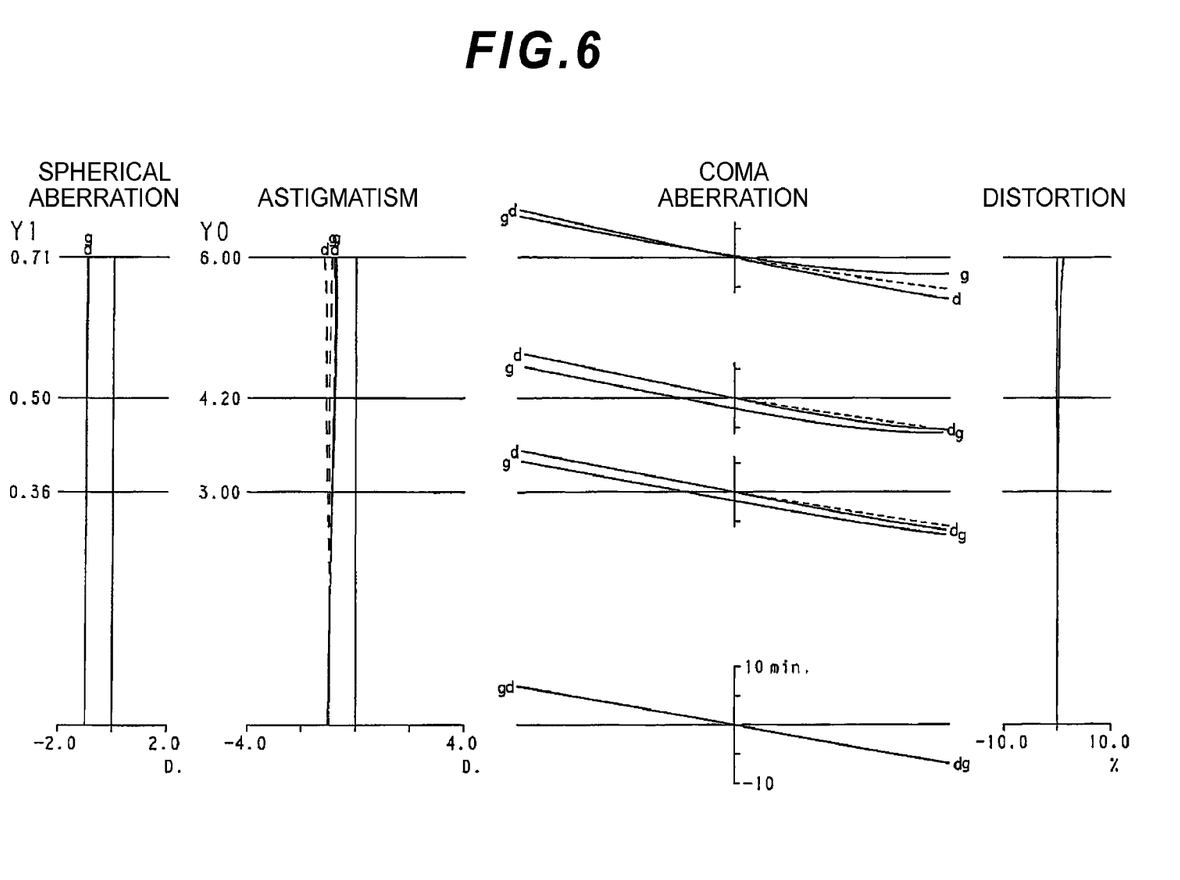
FIG. 6 shows graphs of various aberrations of the eyepiece optical system according to Example 3 when the diopter is $-1$ m$^{-1}$.

FIG. 6 shows graphs of various aberrations (spherical aberration, astigmatism, coma aberration and distortion) of the eyepiece optical system EL3 of Example 3 at diopter −1 m$^{-1}$. As each graph showing aberrations in FIG. 6 clarifies, in the eyepiece optical system EL3 of Example 3, various aberrations including coma aberration and distortion are satisfactorily corrected, and excellent optical performance is implemented.

As described above, according to the present invention, an eyepiece optical system having good optical performance with a minimum generation of ghosts and stray lights can be implemented.

The present invention has been described with configurational requirements of each embodiment to assist understanding of the present invention, but needless to say, the present invention is not limited to the configurational requirements. The content of the description herein below can be used within a scope that does not diminish the optical performance.

In each example, the eyepiece optical system is constituted by three or four lens groups, but the present invention can also be applied to a configuration using a different number of lens groups, such as five or six lens groups. In the configuration, a lens or a lens group may be added to the side closest to the object, or a lens or a lens group may be added to the side closest to the image. A "lens group" refers to a portion having at least one lens isolated by an air gap which changes when zooming is performed.

The lens surface may be formed to be a spherical surface or a plane, or an aspherical surface. If the lens surface is a spherical surface or a plane, lens processing, assembly and adjustment are easy, and deterioration of the optical performance, due to an error in processing, assembly and adjustment, can be prevented. Even if the image plane deviates, the writing performance does not change very much. If the lens surface is an aspherical surface, the aspherical surface can be any aspherical surface out of an aspherical surface generated by grinding, a glass-molded aspherical surface generated by forming glass in an aspherical shape using a die, and a composite aspherical surface generated by forming resin on the surface of the glass so as to be an aspherical shape. The lens surface may be a diffraction surface, and the lens may be a refractive index distributed lens (GRIN lens) or a plastic lens.

Each lens surface may be coated with an anti-reflection film, which has high transmittance in a wide wavelength region, in order to decrease flares and ghosts, implementing a high optical performance at high contrast.

EXPLANATION OF NUMERALS AND CHARACTERS

CAM digital camera (optical apparatus)
OL objective lens
C picture element
Ob image display element (observation object)
EL EL1 to EL3 eyepiece optical system
L1 first lens
L2 second lens
L3 third lens
L4 fourth lens
EP eye point

The invention claimed is:

1. An eyepiece optical system comprising at least three lenses disposed in order from an observation object along an optical axis,
  a final lens disposed closest to an eye point being fixed when adjusting a diopter, and
  the following conditional expression being satisfied:

$$2.2 < |fe/fa| < 6.0$$

where fe denotes a focal length of the final lens, and fa denotes a focal length of the total eyepiece optical system.

2. The eyepiece optical system according to claim 1, wherein
the observation object is an image display element.

3. The eyepiece optical system according to claim 1, wherein
the image display element is a liquid crystal display element.

4. The eyepiece optical system according to claim 1, wherein
the following conditional expression is satisfied:

$0.60<\Sigma d/fa<1.60$ where $\Sigma d$ denotes a distance on the optical axis, from an observation object side lens surface of a first lens disposed closest to the observation object to the eye point side lens surface of the final lens.

5. The eyepiece optical system according to claim 1, wherein
the following conditional expression is satisfied:

$0.60<\Sigma d0/fa<1.20$ where $\Sigma d0$ denotes a distance on the optical axis, from an observation object side lens surface of a first lens disposed closest to the observation object to the eye point side lens surface of the final lens; an air conversion length is used for an optical element that has no refractive power.

6. The eyepiece optical system according to claim 1, wherein
the following conditional expression is satisfied:

$5.00<fa<35.00$ (unit:mm).

7. The eyepiece optical system according to claim 1, wherein
all the lenses constituting the eyepiece optical system are made of plastic.

8. The eyepiece optical system according to claim 1, comprising, in order from the observation object along an optical axis, a first lens and a second lens, wherein
the diopter is adjusted by moving the first lens and the second lens, or only the second lens, along the optical axis.

9. An eyepiece optical system comprising at least three lenses disposed in order from an observation object along an optical axis,
a final lens disposed closest to an eye point being fixed when adjusting a diopter, and
the following conditional expressions being satisfied:

$0.6<|Re2/fa|<5.0$ $0.60<\Sigma d0/fa<1.20$ where fa denotes a focal length of the total eyepiece optical system, Re2 denotes a radius of curvature of an eye point side lens surface of the final lens, and $\Sigma d0$ denotes a distance on the optical axis, from an observation object side lens surface of a first lens disposed closest to the observation object to the eye point side lens surface of the final lens; an air conversion length is used for an optical element that has no refractive power.

10. The eyepiece optical system according to claim 9, wherein
the observation object is an image display element.

11. The eyepiece optical system according to claim 9, wherein
the image display element is a liquid crystal display element.

12. The eyepiece optical system according to claim 9, wherein
the following conditional expression is satisfied:

$0.60<\Sigma d/fa<1.60$ where $\Sigma d$ denotes a distance on the optical axis, from an observation object side lens surface of a first lens disposed closest to the observation object to the eye point side lens surface of the final lens.

13. The eyepiece optical system according to claim 9, wherein
the following conditional expression is satisfied:

$5.00<fa<35.00$ (unit:mm).

14. The eyepiece optical system according to claim 9, wherein
all the lenses constituting the eyepiece optical system are made of plastic.

15. The eyepiece optical system according to claim 9, comprising, in order from the observation object along an optical axis, a first lens and a second lens, wherein
the diopter is adjusted by moving the first lens and the second lens, or only the second lens, along the optical axis.

16. An optical apparatus, comprising:
an objective lens;
a picture element that captures an image formed by the objective lens;
an image display element that displays the image captured by the picture element; and
an eyepiece optical system for observing the image displayed on the image display element,
the eyepiece optical system being the eyepiece optical system according to claim 9.

17. An optical apparatus, comprising:
an objective lens;
a picture element that captures an image formed by the objective lens;
an image display element that displays the image captured by the picture element; and
an eyepiece optical system for observing the image displayed on the image display element,
the eyepiece optical system being the eyepiece optical system according to claim 1.

18. An eyepiece optical system comprising at least three lenses disposed in order from an observation object along an optical axis,
a final lens disposed closest to an eye point being fixed when adjusting a diopter, and
the following conditional expression being satisfied:

$0.5<|Re2/fa|<5.0$ where fa denotes a focal length of the total eyepiece optical system, and Re2 denotes a radius of curvature of an eye point side lens surface of the final lens,
wherein the eyepiece optical system has, in order from the observation object along an optical axis, a first lens and a second lens, and the diopter is adjusted by moving the first lens and the second lens, or only the second lens, along the optical axis.

19. An optical apparatus, comprising:
an objective lens;
a picture element that captures an image formed by the objective lens;

an image display element that displays the image captured by the picture element; and an eyepiece optical system for observing the image displayed on the image display element, the eyepiece optical system being the eyepiece optical system according to claim 18.

20. A method for manufacturing an eyepiece optical system including at least three lenses disposed in order from an observation object along an optical axis, the method comprising:

fixing a final lens disposed closest to an eye point side, when adjusting a diopter; and further comprising one or more of the following features (A), (B), and (C):

(A) disposing each lens in a lens barrel so as to satisfy the following conditional expression:

$$2.2 < |fe/fa| < 6.0$$

where fe denotes a focal length of the final lens, and fa denotes a focal length of the total eyepiece optical system;

(B) disposing each lens in a lens barrel so as to satisfy the following conditional expressions:

$$0.6 < |Re2/fa| < 5.0$$

$$0.60 < \Sigma d0/fa < 1.20$$

where fa denotes a focal length of the total eyepiece optical system, Re2 denotes a radius of curvature of an eye point side lens surface of the final lens, and $\Sigma d0$ denotes a distance on the optical axis, from an observation object side lens surface of a lens disposed closest to the observation object to the eye point side lens surface of the final lens; an air conversion length is used for an optical element that has no refractive power;

(C) disposing each lens in a lens barrel such that a first lens and a second lens are disposed in order from the observation object along an optical axis, and the diopter is adjusted by moving the first lens and the second lens, or only the second lens, along the optical axis, and satisfying the following conditional expression:

$$0.5 < |Re2/fa| < 5.0$$

where fa denotes a focal length of the total eyepiece optical system, and Re2 denotes a radius of curvature of an eye point side lens surface of the final lens.

* * * * *